(12) United States Patent
Preikszat et al.

(10) Patent No.: US 11,526,719 B2
(45) Date of Patent: *Dec. 13, 2022

(54) RFID TAG HAVING AN INTEGRATED ANTENNA COUPLED TO TEST PADS

(71) Applicant: TEXAS INSTRUMENTS INCORPORATED, Dallas, TX (US)

(72) Inventors: Dirk Preikszat, Freising (DE); Stefan Beierke, Furth (DE); Norbert Asche, Moosburg (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,487

(22) Filed: Dec. 30, 2020

(65) Prior Publication Data

US 2021/0117751 A1 Apr. 22, 2021

Related U.S. Application Data

(63) Continuation of application No. 13/973,636, filed on Aug. 22, 2013, now Pat. No. 10,909,440.

(51) Int. Cl.
*G06K 19/077* (2006.01)
*H01Q 7/00* (2006.01)
*H01Q 23/00* (2006.01)

(52) U.S. Cl.
CPC . *G06K 19/07783* (2013.01); *G06K 19/07754* (2013.01); *G06K 19/07775* (2013.01); *H01Q 7/00* (2013.01); *H01Q 23/00* (2013.01)

(58) Field of Classification Search
CPC ....... G06K 19/07775; G06K 19/07722; G06K 19/07773; G06K 19/07745; G06K 19/07749; G06K 19/0775; G06K 19/07777; G06K 19/07779; G06K 19/07781; G06K 19/07783; H01Q 1/2208; H01Q 1/2225; H01Q 1/2283; H01Q 7/00; H01Q 9/27; H01L 23/5227; H01L 22/34; H01L 23/585; H01L 23/645
USPC ....................................................... 235/492
See application file for complete search history.

(56) References Cited

U.S. PATENT DOCUMENTS

| | | |
|---|---|---|
| 4,857,893 A | 8/1989 | Carroll |
| 6,259,158 B1 | 7/2001 | Usami |
| 6,373,447 B1 | 4/2002 | Rostoker |
| 6,421,013 B1 | 7/2002 | Chung |
| 6,509,837 B1 | 1/2003 | Tuttle |
| 6,718,163 B2 | 4/2004 | Tandy |

(Continued)

*Primary Examiner* — Suezu Ellis
(74) *Attorney, Agent, or Firm* — Krista Y. Chan; Charles A. Brill; Frank D. Cimino

(57) ABSTRACT

A radio frequency identification (RFID) tag. In one embodiment, an RFID tag includes an integrated circuit die. The integrated circuit die includes circuitry configured to store information and transmit the stored information responsive to reception of a radio frequency (RF) signal. The integrated circuit die also includes an antenna coupled to the circuitry. The antenna is formed as a loop antenna array configured to transmit and receive RFID signals. Further, the RFID tag includes a first test pad and second test pad formed on the integrated circuit die with the first test pad coupled to a first end of the antenna by a first interconnect and a second test pad coupled to the second end of the antenna by a second interconnect.

18 Claims, 2 Drawing Sheets

(56) References Cited

U.S. PATENT DOCUMENTS

| | | | |
|---|---|---|---|
| 6,818,985 B1 | 11/2004 | Coccioli | |
| 10,909,440 B2 * | 2/2021 | Preikszat | H01Q 7/00 |
| 2002/0067268 A1 * | 6/2002 | Lee | G06K 19/0775 |
| | | | 340/572.1 |
| 2002/0074666 A1 | 6/2002 | Usami | |
| 2003/0052788 A1 | 3/2003 | Kwong-Tai Chung | |
| 2004/0159932 A1 | 8/2004 | Watanabe | |
| 2005/0030181 A1 | 2/2005 | Mickle et al. | |
| 2005/0051872 A1 | 3/2005 | Kawamura | |
| 2005/0093090 A1 | 5/2005 | Shindo | |
| 2005/0173532 A1 | 8/2005 | Hasebe et al. | |
| 2007/0148981 A1 | 6/2007 | Rogge | |
| 2007/0176845 A1 | 8/2007 | Yamazaki et al. | |
| 2007/0257292 A1 | 11/2007 | Shionoiri | |
| 2008/0129623 A1 | 6/2008 | Barry | |
| 2009/0140359 A1 | 6/2009 | Nakashiba | |
| 2010/0277382 A1 | 11/2010 | Tanaka | |
| 2011/0169115 A1 | 7/2011 | Lin | |
| 2011/0169146 A1 | 7/2011 | Ohira | |
| 2013/0002502 A1 | 1/2013 | Wang | |
| 2013/0036802 A1 | 2/2013 | Johnson et al. | |

* cited by examiner

RFID TAG HAVING AN INTEGRATED ANTENNA COUPLED TO TEST PADS

CROSS-REFERENCE TO RELATED APPLICATIONS

This application is a continuation of U.S. patent application Ser. No. 13/973,636, filed Aug. 22, 2013, which is hereby fully incorporated herein by reference.

BACKGROUND

Radio frequency identification (RFID) tag technology has gained enormous attention due to its commercial application in various fields, including intelligent transportation systems, commerce, and security. Using RFID technology, an RFID tag is attached to an object to identify or track. The RFID tag communicates with an RFID reader via transmission and reception of radio signals to allow the reader to identify and/or track the object. With increasing advance of technologies in integrated circuits (ICs), the size of the ICs, such as RFID tags, is shrinking to strike a balance between optimal performance and cost of fabrication.

SUMMARY

Various radio frequency identification (RFID) tag systems are disclosed herein. In some embodiments, an RFID tag includes an integrated circuit die. The integrated circuit die includes circuitry configured to store information and transmit the stored information responsive to reception of a radio frequency (RF) signal. The die also includes an antenna coupled to the circuitry. The antenna is configured to transmit and receive RFID signals. Further, the antenna and the interconnects of the circuitry are formed of a same metal, and fabricated using a same semiconductor process.

In accordance with at least some embodiments, an RFID tag includes a substrate, circuitry disposed on a first layer of the substrate and an antenna disposed on a second layer of the substrate. The circuitry is configured to send identification information of the RFID tag upon reception of a RF signal from a reader. The antenna is coupled to the circuitry and is configured to transmit and receive RFID signals. Each of the antenna and the circuitry include at least one layer of a conductive material that is plated onto the substrate using a same fabrication process.

In accordance with yet other embodiments, a RFID antenna includes an antenna loop array configured to be disposed on a first side of an integrated circuit die. The antenna loop array is formed of at least one layer of aluminum that is at least four micrometers thick. The antenna loop array is configured to wirelessly communicate with an RFID tag reader via a band centered about 13 megahertz.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "approximately" indicates an allowable variance of ±10% from a stated value. Accordingly, approximately "10" includes a range or 9-11.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A radio frequency identification (RFID) tag includes an antenna that provides an interface to the wireless medium for communication and power capture. To provide the needed level of efficiency, some conventional RFID tags include a discrete antenna coupled to the RFID integrated circuit (IC). Other conventional RFID tags may include an integrated antenna, but to provide the requisite efficiency such an antenna must conventionally be fabricated using a different process than is applied to construct the active circuitry of the tag. Neither conventional alternative is desirable due increased fabrication costs and/or increased tag size. As IC size decreases, conventional approaches to RFID tag antenna construction serve as impediments to tag miniaturization.

Figure 1:
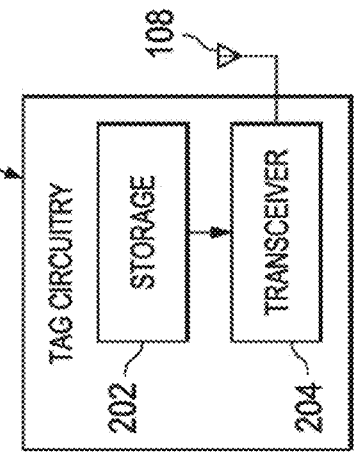
FIG. 1 shows a block diagram of a radio frequency identification (RFID) system in accordance with various embodiments.

Embodiments of the present disclosure include an RFID tag with an integrated aluminum antenna. The RFID antenna is capable of efficient operation in the 13 megahertz (MHz) frequency range. Further, the disclosed RFID antenna occupies an area not larger than RFID tag circuitry to which the RFID antenna is coupled, and the antenna and the circuitry are constructed using the same fabrication (semiconductor/metallization) process. Thus, embodiments of the RFID tag disclosed herein advantageously provide optimal performance while reducing overall tag cost and size FIG. 1 shows a block diagram of an RFID system 100 in accordance with various embodiments. The system 100 includes an RFID reader 104, an object 106, and a RFID tag 102 attached to the object 106. The object 106 may be any physical entity to which the RFID tag 102 can be attached. The RFID reader 104 is an interrogation device that retrieves information from RFID tags in the vicinity of the reader 104. The RFID reader 104 exposes the RFID tag 102 to electromagnetic radiation (e.g., wireless signal 101) that activates (e.g., powers) the RFID tag 102. Responsive to the radio frequency signal 101, the RFID tag 102 performs various operations. For example, the RFID tag 102 may transmit encoded information, via a wireless signal 103, to the RFID reader 104. As such, the reader 104 may function as an interrogator that retrieves information associated with the object 106 from the RFID tag 102. Alternatively or additionally, the reader 104 may be coupled to external systems (not shown) that provide data storage and analysis or trigger a further action. Although as a matter of concision FIG. 1 shows only a single reader 104, and RFID tag 102, in practice, the system 100 may include any number of readers and/or RFID tags. The RFID tag 102 includes a novel integrated antenna 108 that allows the cost of the RFID tag 102 to be reduced without loss of performance.

Figure 2:
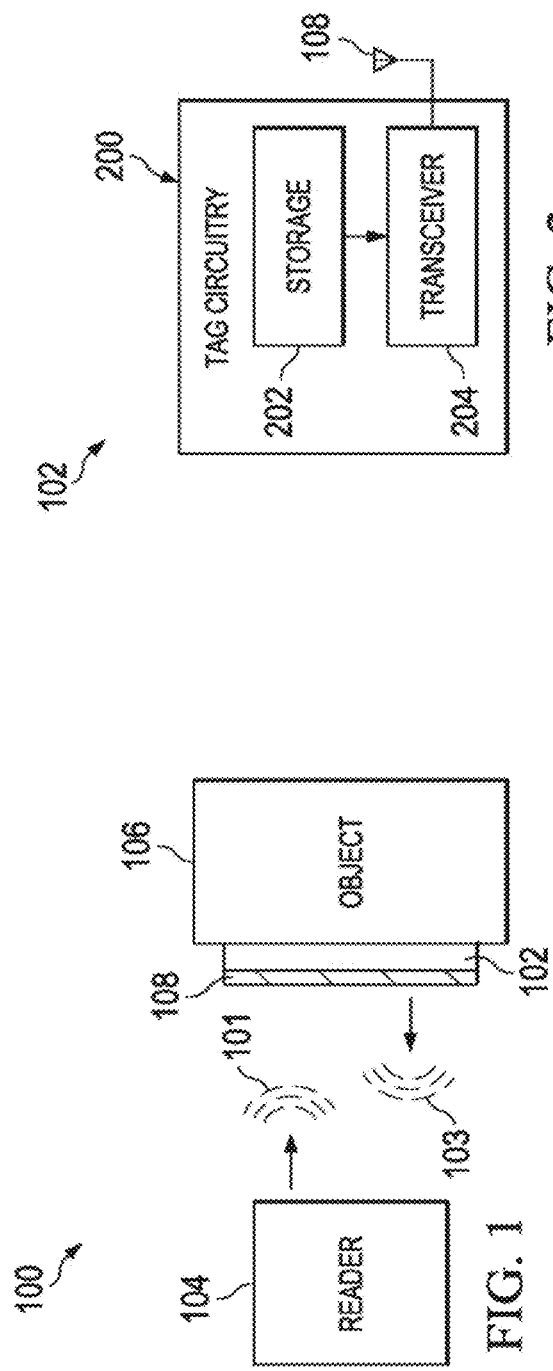
FIG. 2 shows a block diagram of a RFID tag with an integrated antenna in accordance with various embodiments.

FIG. 2 shows a block diagram of the RFID tag 102. The RFID tag 102 includes tag circuitry 200 and the integrated antenna 108. The tag circuitry 200 includes storage 202 and transceiver 204. The tag circuitry 200 may include other components and subsystems that have been omitted from FIG. 2 in the interest of clarity. For example, the circuitry 200 may include a power subsystem, a processor, etc. The storage 202 may include non-volatile memory such as FLASH memory, read-only memory (ROM), electrically-erasable programmable ROM, etc. The storage 202 may also include volatile memory, such as static random access memory. The storage 202 may store identification information of the RFID tag 102 that is to be wirelessly transmitted to the reader 104.

The transceiver 204 is coupled to the antenna 108. The transceiver 204 receives electrical signals generated by the antenna 108 responsive to RF signals transmitted by the reader 104, and transmits, via the antenna 108, information, such as the identification information stored in storage 202. The transceiver 204 may initiate transmission responsive to reception of a radio frequency signal (e.g., signal 101) transmitted by the reader 104.

To operate the RFID tag 102, the RFID tag 102 utilizes a voltage induced by the inductance of the antenna 108 in the RFID tag 102, based on Ampere's law and Faraday's law, which state that flowing current in a conductor (e.g., an antenna loop) produces a magnetic field around the conductor; and a time-varying magnetic field through a surface bounded by a closed path induces a voltage around the loop. More particularly, a resonant frequency, f, of the antenna 108 is determined as:

$$f = \frac{1}{2\pi\sqrt{LC}},$$

where:

L is the inductance of the antenna 108; and

C is the capacitance of the antenna 108 including parasitic capacitor.

Thus, in order to effectively utilize the RFID tag 102 at a desired operating frequency, parameters of the antenna 108, including L and C, must be finely tuned.

Embodiments of the RFID tag 102 may communicate with the reader 104 using a wireless frequency band centered at 13 MHz. Accordingly, in such embodiments, the antenna 108 is tuned to operate in the 13 MHz band. In conventional RFID tags, an antenna suitable for operation in the 13 MHz band increases the size and/or cost of the tag because additional process steps and/or real estate are required. The antenna 108 advantageously requires no more real estate than the active circuitry 200 of the tag 102 and can be fabricated using the same semiconductor/metallization process as the active circuitry 200. Accordingly, embodiments of the antenna 108 allow the size and cost of the RFID tag 102 to be reduced relative to conventional antenna implementations.

Figure 3:
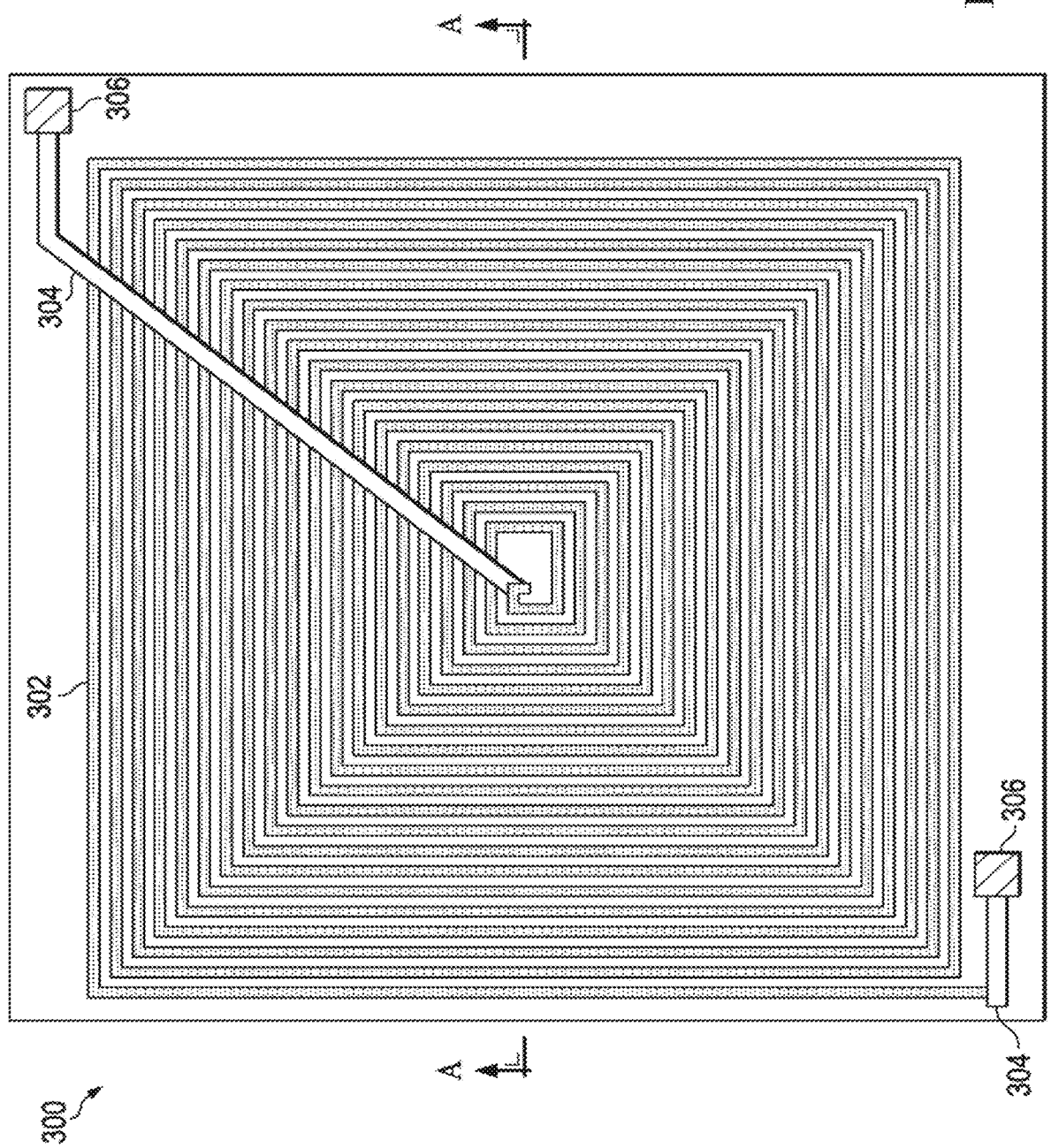
FIG. 3 illustrates a top view of a RFID tag die with an integrated antenna in accordance with various embodiments.

FIG. 3 illustrates a top view of a RFID tag die 300, including views of multiple layers, with an integrated antenna 108 for use in the RFID tag 102 in accordance with various embodiments. The die 300 integrates all the components of the tag 102. The die 300 includes antenna loops 302, a plurality of interconnects 304, a plurality of antenna pads 306 and tag circuitry 200 (shown in FIG. 2). The tag circuitry 200 is disposed on a different layer of the die 300 from the antenna loops 302. In an embodiment, the antenna loops 302 comprise a plurality of rectangular electrode patterns which may be referred to as an antenna loop array. Although the patterns shown herein are rectangular in shape, in some embodiments, the patterns of the antenna loops 302 may be rectangular, circular, multi-sided, or combinations thereof.

Still referring to FIG. 3, the circuitry 200 is coupled to the antenna pads 306. The circuitry 200 electrically communicates with the antenna loops 302 via the interconnects 304 and the antenna pads 306. In some embodiments, the circuitry 200 may be an application-specified integrated circuit (ASIC) or other type of integrated circuit. The antenna loop 302 is configured to receive (e.g., 101 in FIG. 1) and transmit (e.g., 103 in FIG. 1) RFID signals and, based on the received signal 101, to induce a supplied voltage to power the circuitry 200 via the interconnects 304 and the antenna pads 306. The circuitry 200 drives the information stored in the RFID tag die 300 to the antenna loops 302. In some preferred embodiments, the antenna pads 306 may serve as test pads, used to connect with external antennas for testing.

In some embodiments, the metal interconnects formed with regard to the active circuitry 200 of the tag 102, the antenna loops 302, the interconnects 304 and the antenna pads 306 are all formed of aluminum, and are deposited on the die 300 using a same semiconductor process, thereby reducing fabrication cost. The semiconductor process may include electron beam vapor deposition, molecular beam epitaxy, or sputtering. In some embodiments, the area of the antenna loops 302 is constrained to be no more than the area of the active tag circuitry 200. Consequently, integrating the antenna 108 does not increase the size of the die 300. The antenna loops 302 may have an inductance of approximately 5 microhenries (µH). The antenna loops 302 may include approximately 80 loops, or turns, within the area of the RFID tag die 300. In some embodiments, the antenna loops 302 may have an inductance of at least 5 µH or an inductance of at least 3 and include at least 50 turns or at least 80 turns. In some embodiments, the total area of the die 300 may be approximately one square millimeter in area. In other embodiments the area of the die 300 may be no more than one square millimeter (mm).

Figure 4:
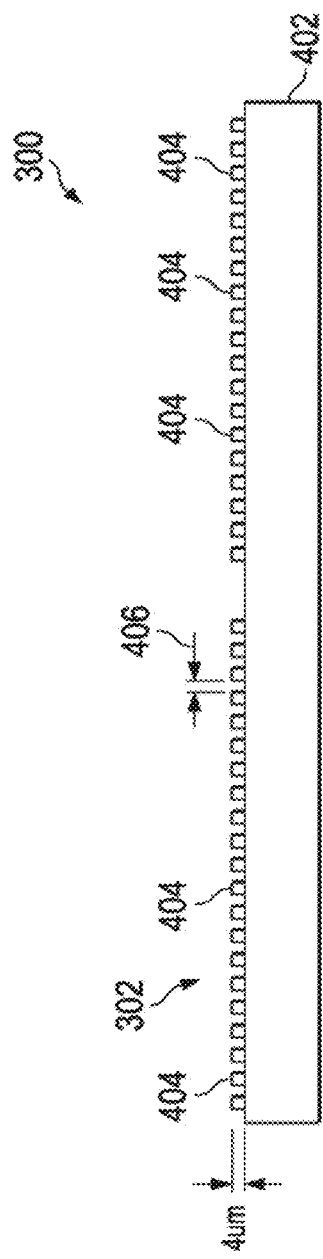
FIG. 4 illustrates a cross-sectional view of a RFID tag die with an integrated antenna in accordance with various embodiments.

FIG. 4 illustrates a cross-sectional view of the RFID tag die 300 with integrated antennas 302 in accordance with various embodiments. FIG. 4 is a view of cross-section "A-A" of the antenna loops 302 depicted in FIG. 3. Section A-A shows a plurality of aluminum segments 404, spaced with gaps 406, of antenna loops 302. The antenna loops 302 are disposed on silicon die 402, which includes the circuitry 200 electrically coupled to the antenna loops 302. Each segment 404 of antenna loops 302 may have a width of approximately 1.5 micrometers (μm). The thickness of the aluminum of the antenna loops 302 may greater than that applied to standard interconnects. In some embodiments, the antenna loops may have a thickness of at least approximately 4 μm (i.e., 3.6 μm or more). The antenna loops may include a spacing gap 406 approximately 2 μm in width. Although the cross section of each antenna loop 302 shown in FIG. 4 is illustrated as having a rectangular shape, the cross sectional geometry may include geometries of other shapes such as a semi-circle, trapezoid, square, polygon, circle, triangle, or combinations thereof.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus comprising:
   a radio frequency identification (RFID) tag comprising:
      an integrated circuit die, comprising configured to store information and transmit the stored information in response to a received radio frequency signal;
      an antenna disposed on a first side of the integrated circuit die, the antenna formed as a loop antenna array having a nested loop wherein an outward side of the antenna faces away from the integrated circuit die and the antenna is configured to transmit and receive RFID signals;
      a first test pad formed on the integrated circuit die and a second test pad formed on the integrated circuit die; and
      a first interconnect that couples the first test pad to a first end of the antenna and a second interconnect that couples the second test pad to a second end of the antenna, the second end of the antenna being at the end of the nested loop, wherein a portion of the second interconnect is disposed overlying the outward side of the antenna and the antenna, the first and second test pads, and the first and second interconnects are made of the same material.

2. The apparatus of claim 1, wherein the antenna, first test pad, and first interconnect are made of aluminum.

3. The apparatus of claim 2, wherein the aluminum is approximately 4 micrometers or more in thickness.

4. The apparatus of claim 1, wherein the antenna comprises at least 50 loops.

5. The apparatus of claim 1, wherein the antenna has an inductance of at least 3 microhenries.

6. The apparatus of claim 1, wherein the antenna is tuned to operate in an RF range centered about 13 megahertz.

7. The apparatus of claim 1, wherein the die is approximately one square millimeter or less in area.

8. The apparatus of claim 1, wherein the apparatus is attached to an item, and is configured to provide tracking of the item based on RF signals transmitted via the antenna.

9. The apparatus of claim 1, wherein the material is a metal.

10. An apparatus comprising:
    a radio frequency identification (RFID) tag comprising:
       circuitry disposed on a substrate of an integrated circuit die and configured to send information of the RFID tag in response to a received radio frequency signal;
       an antenna disposed on a first side of the integrated circuit die above the substrate and coupled to the circuitry, the antenna being an antenna loop array of a nested loop that overlays the circuitry, wherein an outward side of the antenna faces away from the integrated circuit die and the antenna is configured to transmit and receive RFID signals; and
       a test pad disposed above the substrate and coupled to the circuitry to facilitate testing; and
       an interconnect that couples the test pad to the antenna at an end of the nested loop of the antenna loop array, wherein a portion of the interconnect is disposed on the outward side of the antenna and the antenna, test pad, and interconnect are made of the same material.

11. The apparatus of claim 10, wherein the circuitry comprises:
    a memory circuit disposed on a substrate and configured to store the information; and
    a transceiver disposed on the substrate and configured to transmit the information in response to the radio frequency signal.

12. The apparatus of claim 10, wherein each of the antenna and the circuitry comprise at least one layer of a conductive material that is plated onto the substrate using a same fabrication process.

13. The apparatus of claim 10, wherein the antenna is disposed within an outer perimeter of the substrate.

14. The apparatus of claim 10, wherein the antenna, test pad, and interconnect are made of aluminum.

15. The apparatus of claim 10, wherein the apparatus is attached to an item and is configured to provide tracking of the item in response to the radio frequency signal.

16. The apparatus of claim 10, wherein the apparatus is attached to an item and is configured to provide tracking of the item in response to the radio frequency signal by transmitting an encoded RFID signal.

17. The apparatus of claim 10, wherein the circuitry is powered by the radio frequency signal from a reader.

18. The apparatus of claim 10, wherein the radio frequency signal is an interrogation signal.

* * * * *